United States Patent
Abdelgany

(10) Patent No.: US 6,208,844 B1
(45) Date of Patent: Mar. 27, 2001

(54) SYSTEM AND PROCESS FOR SHARED FUNCTIONAL BLOCK COMMUNICATION TRANSCEIVERS WITH GPS CAPABILITY

(75) Inventor: MohyEldeen Fouad Abdelgany, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/256,450

(22) Filed: Feb. 23, 1999

(51) Int. Cl.$^7$ .......................... H01Q 11/12; H04M 11/00
(52) U.S. Cl. .......................... 455/82; 455/118; 455/404; 342/357.12
(58) Field of Search .................. 455/82, 83, 118, 455/456, 556, 562, 404; 342/357.12; 343/725, 729; 370/320

(56) References Cited

U.S. PATENT DOCUMENTS

| | | | |
|---|---|---|---|
| 5,410,747 | * | 4/1995 | Ohmagari et al. ............. 455/118 |
| 5,418,818 | * | 5/1995 | Marchetto et al. ............. 455/118 |
| 5,650,792 | * | 7/1997 | Moore et al. .................. 343/725 |
| 5,867,535 | * | 2/1999 | Phillips et al. ................. 455/118 |
| 5,881,371 | * | 3/1999 | Reynolds ......................... 455/83 |
| 5,924,024 | * | 7/1999 | Ikeda et al. .................... 455/118 |
| 5,991,309 | * | 11/1999 | Jensen et al. .................. 455/118 |

\* cited by examiner

*Primary Examiner*—May Maung
(74) *Attorney, Agent, or Firm*—Thomas, Kayden, Horstemeyer & Risley, L.L.P.

(57) ABSTRACT

A communication system capable of communicating RF signals at any one of a plurality of communication standards through a common antenna is disclosed. The communication system includes a transmitting unit having at least one transmit RF information signal output, and a receiving unit having at least one receive RF information signal input and a GPS RF information signal input. The transmitting unit includes a modulator for modulating a transmit IF with a transmit baseband information signal to generate a transmit IF information signal and an upconverter for upconverting the transmit IF information signal with a transmit RF to generate at least one transmit RF information signal. The receiving unit includes a receive downconverter for downconverting the at least one receive RF information signal with a receive RF to generate a receive IF information signal, a GPS downconverter for downconverting the GPS RF information signal with the receive RF to generate a GPS IF information signal, and a demodulator for demodulating the receive IF information signal and the GPS IF information signal with a receive IF to generate GPS and receive baseband signals. An antenna is coupled to the at least one transmit RF information signal output, the at least one receive RF information signal input, and the GPS RF information signal input for transmitting and receiving RF information signals.

34 Claims, 3 Drawing Sheets

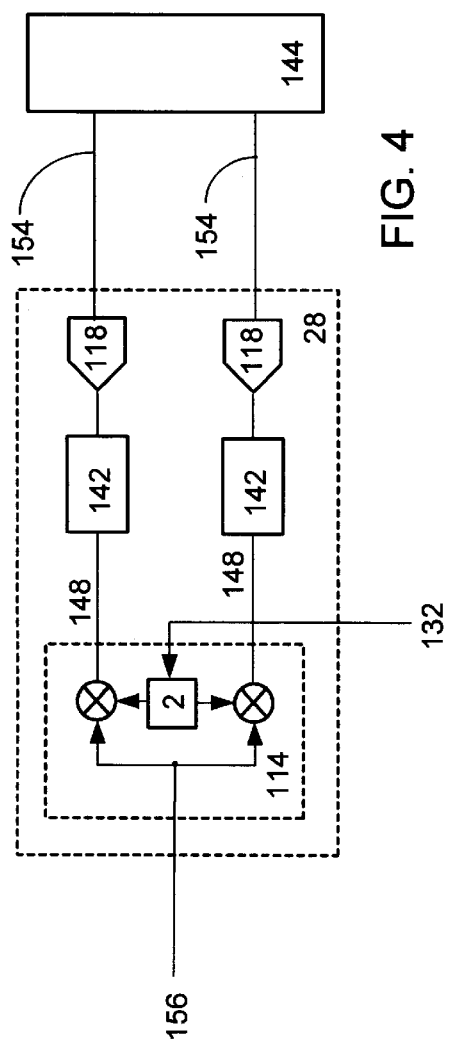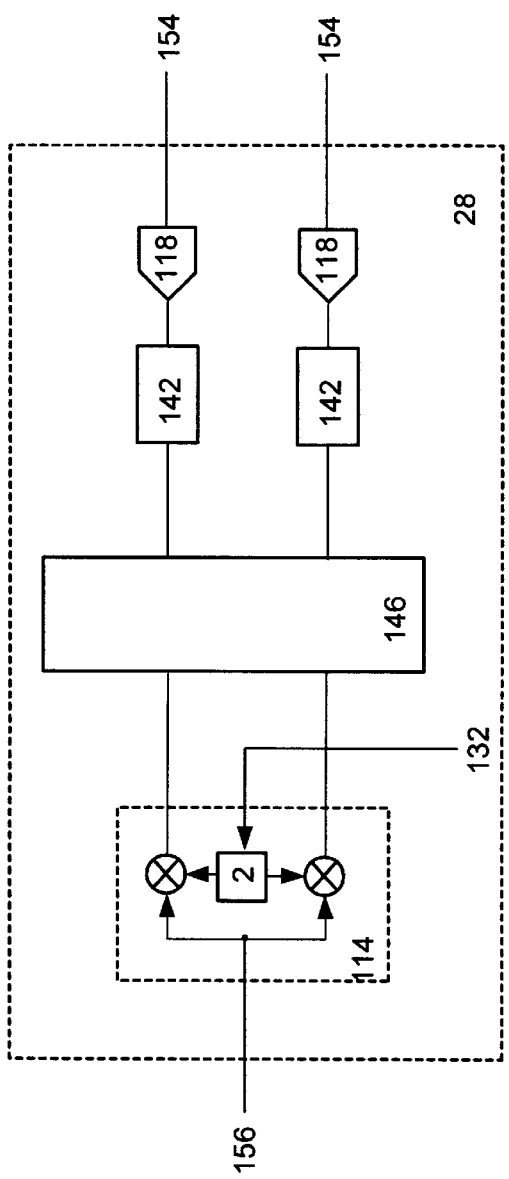

SYSTEM AND PROCESS FOR SHARED FUNCTIONAL BLOCK COMMUNICATION TRANSCEIVERS WITH GPS CAPABILITY

BACKGROUND OF THE INVENTION

1. Field of the Invention

The present invention relates, generally, to communication systems and processes which use radio frequency (RF) transmitters and receivers (transceivers), and, in particular embodiments, to multi-service systems and processes with communication and Global Positioning System (GPS) capabilities that share functional blocks to minimize size, weight, complexity, power consumption, and cost.

2. Description of Related Art

It has become increasingly important to minimize the size, weight, complexity, power consumption, and cost of various electronic devices, especially personal communication devices such as cellular telephones, personal pagers, cordless telephones, and the like. One way to minimize such characteristics is to minimize the number of components and functions required in the electronic device, or to perform multiple functions using the same components. However, personal communication devices such as cellular telephones often require complex circuitry with a number of power-inefficient components for performing particular functions. This is especially true in modem cellular communications, where several different communication standards are employed worldwide, and cellular telephones with the flexibility to operate under multiple communications standards are highly desirable from a consumer and manufacturing perspective.

For example, GSM900 (Global System for Mobile 900) is a digital cellular standard operating in the 900 MHz frequency band that is currently used in Europe and Asia. DCS1800 is another digital cellular standard based on GSM technology, operating in the 1800 MHz frequency band and also currently used in Europe and Asia. The United States uses PCS 1900, a third digital cellular standard similar to DCS 1800, but operating in the 1900 MHz band. Multi-band cellular telephones capable of operating under all of these standards afford consumers widespread applicability and allow manufacturers to benefit from the cost-efficiency of a common design.

However, multi-band cellular telephones present a number of design challenges. Conventional single-band transmitters typically require two separate frequencies, a fixed intermediate frequency (IF) for modulation and a tunable RF for upconversion. Conventional single-band receivers also typically require two separate frequencies, a tunable RF for downconversion and a fixed IF for demodulation. Thus, a single-band cellular telephone may require as many as four different frequency sources. Multi-band cellular telephones exacerbate the problem because the modulation, upconversion, downconversion, and demodulation processes for each band may require different frequencies. Furthermore, the different frequencies employed by each band may require different filters for the transmit and receive function of each band.

The portability of cellular telephones has led to additional design challenges unrelated to the basic function of the cellular telephone. In the nationwide 911 system for reporting emergencies, 911 operators are typically provided with the location of the telephone from which the 911 call was initiated to assist emergency personnel in responding to the distress call. However, because cellular telephones are mobile, current methods for tracing 911 telephone calls are unable to provide location information when the call is made from a cellular telephone. This problem is not insignificant, for studies have shown that 30–40% of all 911 calls are made from cellular telephones. To address this problem, the Federal Communications Commission (FCC) has mandated that, by the end of the year 2001, cellular service providers must provide the ability to automatically locate cellular telephones calling 911 to within about 20 meters in addition to basic cellular communications. This location identification capability is referred to in the industry and herein as E911 support.

Even in non-emergency situations, knowledge of the location of a cellular telephone is of keen consumer interest. Travelers in unfamiliar areas may use their cellular telephone to both identify their present position and receive instructions on how to proceed to their desired destination. Conversely, those in unfamiliar territory may use their cellular telephone to identify their present position and assist others in locating them. A cellular telephone capable of providing positioning information may benefit the business traveler who encounters a rental automobile equipped with a navigation system able to utilize such positioning information. Real estate agents, delivery services, and the like may be able to use positioning information to locate houses or businesses.

Thus, both the FCC—imposed requirement and consumer—driven need for cellular telephone positioning information have created a market for cellular telephones with multi-service capabilities, increasing the design challenge of producing cellular telephones of minimal size, weight, complexity, power consumption, and cost.

SUMMARY OF THE DISCLOSURE

Therefore, embodiments of the present invention provide a system and process for a shared functional block communication transceiver with E911 support to automatically supply the position of the transceiver when a 911 call is made from the transceiver.

Further embodiments of the present invention provide a system and process for a shared functional block communication transceiver with a full Global Positioning System (GPS) solution to supply the position of the transceiver upon request by the operator.

Further embodiments of the present invention provide a system and process for a shared functional block communication transceiver with GPS capability that shares frequency sources, amplifiers, and mixers to minimize size, weight, complexity, power consumption, and cost.

These and other objects are accomplished according to a communication system capable of communicating RF signals at any one of a plurality of communication standards through a common antenna. The communication system includes a transmitting unit having at least one transmit RF information signal output, and a receiving unit having at least one receive RF information signal input and a GPS RF information signal input. The transmitting unit includes a modulator for modulating a transmit IF with a transmit baseband information signal to generate a transmit IF information signal and an upconverter for upconverting the transmit IF information signal with a transmit RF to generate at least one transmit RF information signal. The receiving unit includes a receive downconverter for downconverting the at least one receive RF information signal with a receive RF to generate a receive IF information signal, a GPS downconverter for downconverting the GPS RF information signal with the receive RF to generate a GPS IF information signal, and a demodulator for demodulating the receive IF information signal and the GPS IF information signal with a receive IF to generate GPS and receive baseband signals. An antenna is coupled to the at least one transmit RF information signal output, the at least one receive RF information signal input, and the GPS RF information signal input for transmitting and receiving RF information signals.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

FIG. 4 is a block diagram representation of a demodulator coupled to a full GPS processor for providing a complete GPS solution according to an embodiment of the present invention.

FIG. 5 is a block diagram representation of a demodulator comprising a Coleman filter for providing E911 support according to an embodiment of the present invention.

DETAILED DESCRIPTION OF PREFERRED EMBODIMENTS

Figure 1:
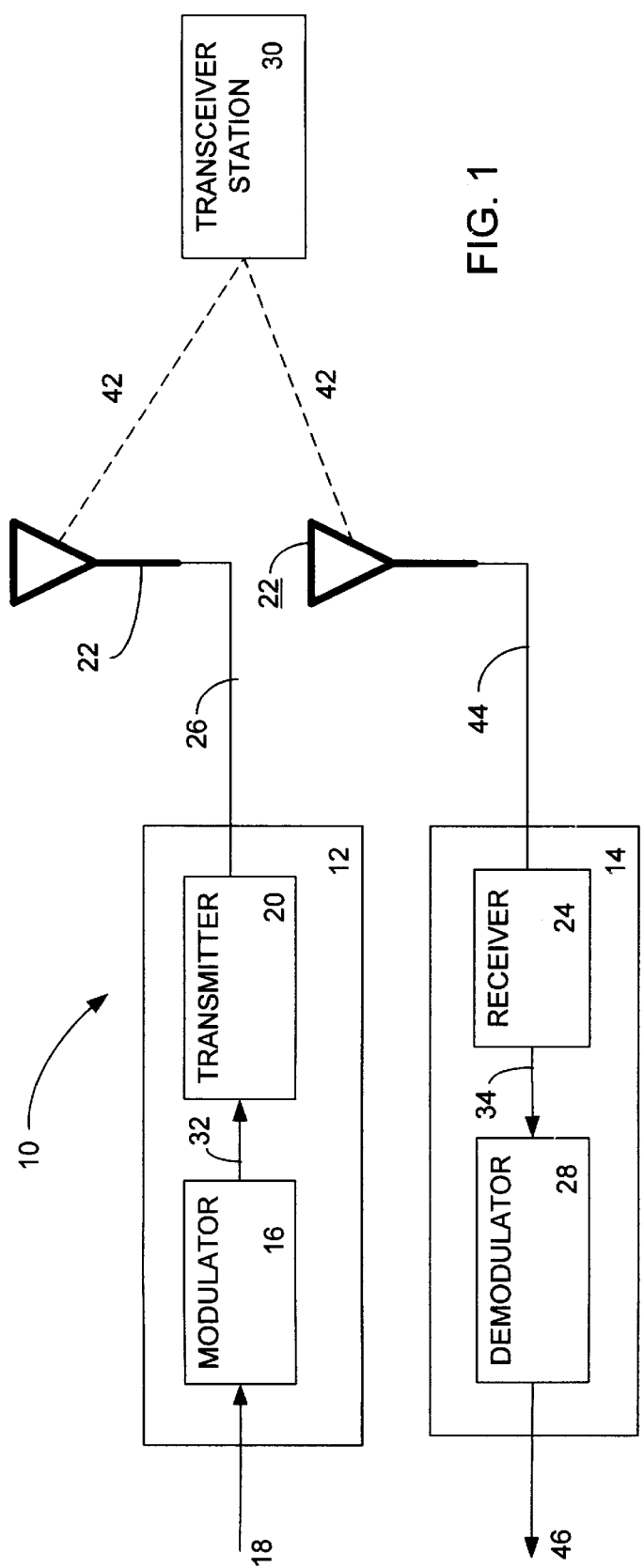
FIG. 1 is block diagram representation of a system environment according to an example embodiment of the present invention.

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Cellular communication systems employ several different communication standards worldwide. Multi-band cellular telephones, with the flexibility to operate under multiple communications standards, afford consumers widespread applicability and allow manufacturers to benefit from the cost-efficiency of a common design.

To realize a cost-efficient design, multi-band cellular telephones must minimize size, weight, complexity, and power consumption. However, the portability of cellular telephones has led to additional requirements unrelated to the basic function of the cellular telephone that increase the design burden. Because cellular telephones are mobile, the FCC has mandated that by the end of the year 2001, cellular service providers will be required to provide E911 support, which is the ability to automatically locate cellular telephones calling 911. Even in non-emergency situations, knowledge of the location of a cellular telephone is often helpful to assist the operator in navigation. These FCC— imposed and consumer—driven capabilities add to the design challenge of producing cellular telephones of minimal size, weight, complexity, power consumption, and cost.

In embodiments of the present invention, Global Positioning System (GPS) technology is used to generate the positioning information. GPS is a system that utilizes a constellation of satellites to identify the location of a recipient of GPS signals transmitted by the constellation of GPS satellites. Full GPS capability is not needed to provide E911 support. Cellular telephones with only E911 support according to embodiments of the present invention use only a portion of the processing power of the full GPS solution, and transmit information to a server in a base station where calculations are performed. However, embodiments of the present invention also include cellular telephones with the full GPS solution that contain the basic GPS engine and perform most or all of the RF and baseband processing and acquisition within the cellular telephone. With full GPS capability, GPS may be invoked at any time to provide the longitudinal and latitudinal coordinates (or other geographic coordinate information) of the cellular telephone.

Embodiments of the present invention therefore relate to shared functional block communication transceivers with GPS capability that share frequency sources, amplifiers, and mixers between bands and services. It should be noted, however, that transceivers according to embodiments of the present invention are not unique to cellular communications and may be employed in a variety of communications electronics, including wireless transmission systems as well as wired systems. Thus, embodiments of the invention described herein may involve various forms of communications systems. However, for purposes of simplifying the present disclosure, preferred embodiments of the present invention are described herein in relation to personal wireless communications systems, including, but not limited to digital mobile telephones, digital cordless telephones, digital pagers, combinations thereof, and the like. Such personal communications systems typically include one or more portable or remotely located receiver and/or transmitter units.

Specifically, for purposes of illustration, the following discussion will focus on GPS and one cellular communication standard, Code Division Multiple Access (CDMA). In CDMA-900, frequency bands are allocated such that a mobile subscriber unit will transmit signals over a transmit band of 824–849 MHz and receive signals over a receive band of 869–894 MHz. In addition, the CDMA-900 capability discussed herein is capable of operating in analog Advanced Mobile Phone System (AMPS) mode when CDMA service is unavailable. However, references to CDMA below could also apply to CDMA-1900 (CDMA operating in the 1900 MHz band) or to any other communication standard, and it should be noted that other communication standards such as, but not limited to, GSM, EGSM, DCS, and PCS may also be used in combination with the GPS capability in a manner similar to that described herein with respect to CDMA.

A generalized representation of a communication system according to an embodiment of the present invention is shown in FIG. 1, wherein a transceiver 10 includes a transmitting unit 12 and a receiving unit 14, coupled for communication over a communication channel 42. Transmitting unit 12 includes a modulator 16 coupled to receive a transmit baseband information signal 18 from a signal source (not shown in FIG. 1). In one representative embodiment, the signal source may include, for example, a microphone for converting sound waves into electronic signals and sampling and analog-to-digital converter electronics for sampling and converting the electronic signals into digital signals representative of the sound waves. In other embodiments, the signal source may include any suitable device for producing digital data signals for communication over channel 42, such as, but not limited to, a keyboard, a digital voice encoder, a mouse or other user input device, a sensor, monitor or testing apparatus, or the like.

Modulator 16 provides a transmit IF information signal 32 as an output to a transmitter 20. A transmit RF information signal 26 is produced by transmitter 20 for transmission from an antenna 22. Receiving unit 14 includes a receiver 24 coupled to antenna 22 to process a receive RF information signal 44. Receiver 24 provides a modulated receive IF information signal 34 to a demodulator 28, which demodulates receive IF information signal 34 and generates receive baseband information signals 46.

The demodulated receive baseband information signals 46 from demodulator 28 may be provided to signal processing electronics, sound producing electronics or the like, depending upon the nature of use of the transceiver 10. The transmitting and receiving units 12 and 14 include further components, power supplies, and the like, well known in the art for effecting transmission and reception of signals and for carrying out other functions specific to the nature and application of use of the transceiver 10.

In preferred transceiver embodiments, such as cellular telephone embodiments or cordless telephone embodiments, each transmitting unit 12 and receiving unit 14 is configured to function as both a transmitting unit and a receiving unit. In one system embodiment, transmitting unit 12 and receiving unit 14 transmit and receive signals directly therebetween. In other system embodiments, transmitting unit 12 and receiving unit 14 communicate through one or more additional transceiver stations 30 (such as repeaters, base or cell stations, or the like).

Figure 2:
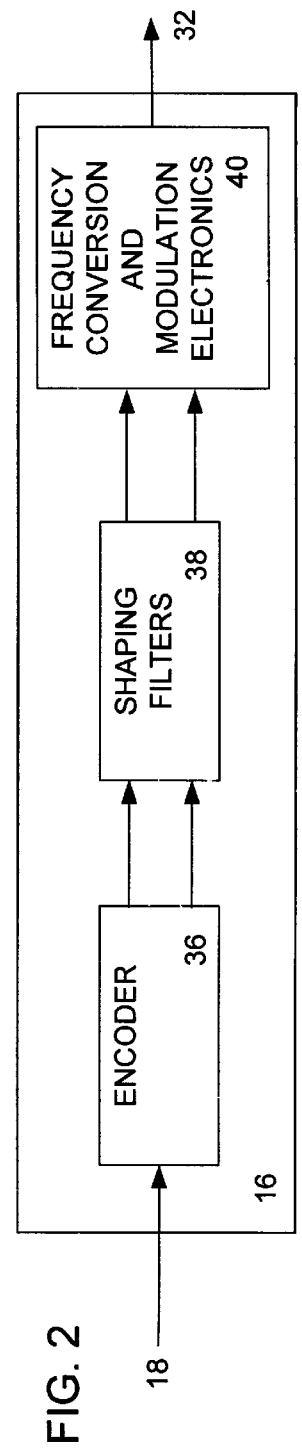
FIG. 2 is a more detailed block diagram representation of the modulator in the system of FIG. 1.

As illustrated in the modulator 16 of FIG. 2, in digital cellular telephone or cordless telephone system embodiments transmit baseband information signal 18 provides sampled voice (or sound) signals in the form of baseband I and Q channel signals to an encoder 36. In one preferred cellular telephone embodiment, encoder 36 comprises a Phase Shift Key encoder, such as, but not limited to, a π/4-shift Quadrature Phase Shift Key mapper with differential encoder (π/4 DQPSK), and shaping filters 38 comprise pulse shaping filters for smoothing the encoder output signal. An example of a π/4 DQPSK and pulse shaping electronics is described in the article titled: "π/4-shift QPSK Digital Modulator LSIC for Personal Communication Terminals," by Tetsu Sakata, Kazuhiko Seki, Shuji Kubota and Shuzo Kato, Proc. 5th IEEE International Symposium on Personal, Indoor and Mobile Radio Communications, 1994 (incorporated herein by reference). Other embodiments may employ other suitable encoding schemes, including but not limited to Amplitude Shift Keying and Frequency Shift Keying schemes.

I and Q outputs of the encoder pass through shaping filters 38 and then to frequency conversion and modulation electronics 40, the output of which comprises a transmit IF information signal 32. Transmit IF information signal 32 is then fed to transmitter 20 as shown in FIG. 1, which provides the transmit RF information signal 26 to the antenna 22 for transmission.

Figure 3:
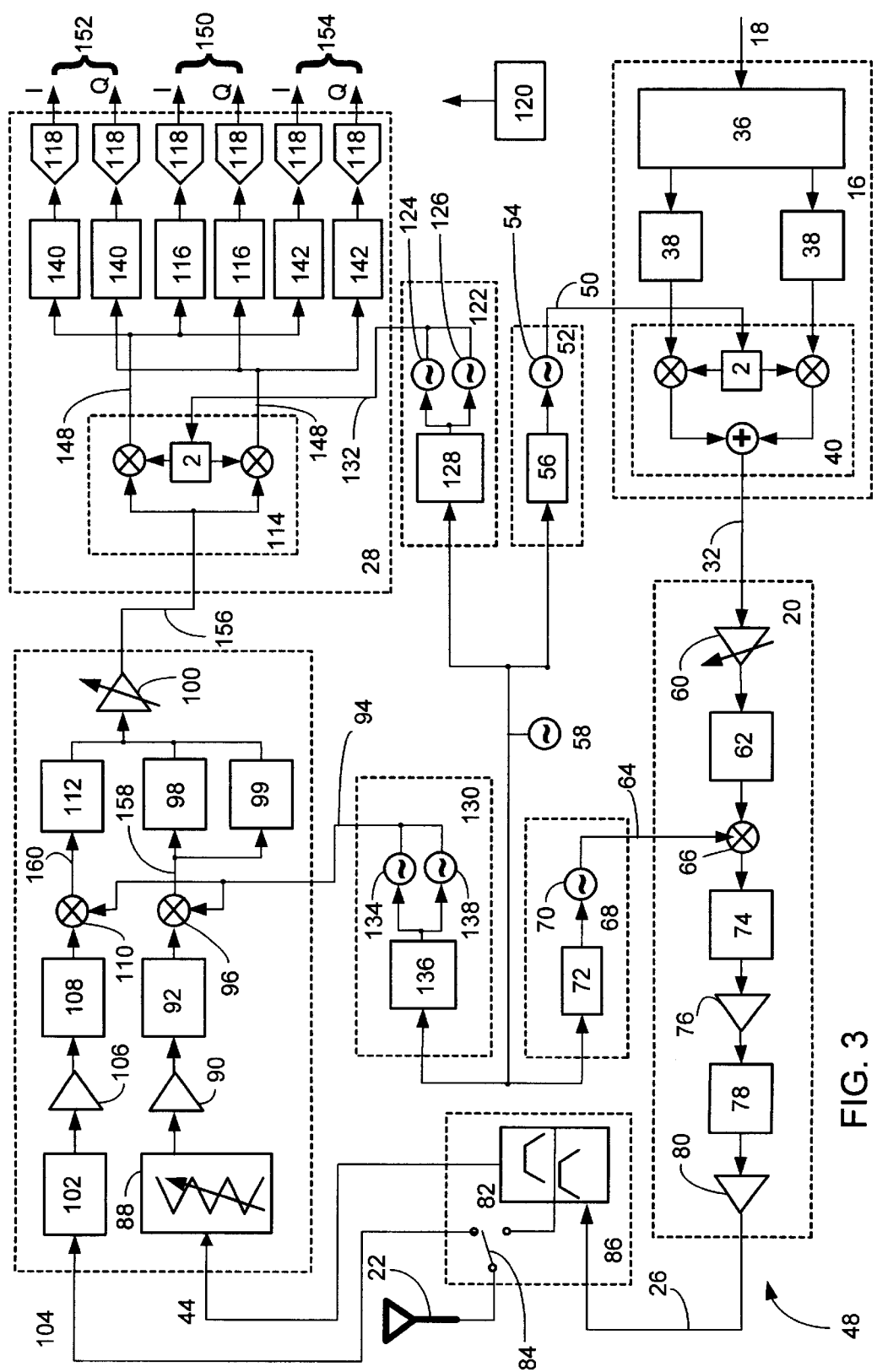
FIG. 3 is a block diagram representation of a shared functional block communication transceiver with GPS capability according to an embodiment of the present invention.

A shared functional block communication transceiver with GPS capability 48 according to an embodiment of the present invention is illustrated in FIG. 3. The transceiver 48 includes a modulator 16 as described above with reference to FIG. 2. For purposes of illustration and discussion, the communication transceiver with GPS capability 48 of FIG. 3 is switchable between the CDMA and GPS communication standards.

In the CDMA transmit path, frequency conversion and modulation electronics 40 receive the I and Q outputs of shaping filters 38 and modulate a transmit IF LO 50 with the I and Q outputs to produce a transmit IF information signal 32. Transmit IF LO 50 is generated by a transmit IF frequency generator 52 comprising a transmit IF frequency source 54 phase-locked to a reference source 58 by transmit IF loop electronics 56. In preferred embodiments of the present invention, transmit IF frequency source 54 is a voltage controlled oscillator (VCO). However, in alternative embodiments of the present invention, transmit IF frequency source 54 may be any adjustable frequency source.

Transmit IF information signal 32 is then amplified by a transmit IF variable gain amplifier (VGA) 60 within transmitter 20. The CDMA communication standard requires transmit power control from +23 dB to −50 dBm at the antenna, representing a 73 dB dynamic range requirement. Transmit IF VGA 60 provides this power control by adjusting its gain based on commands received from the base station.

The output of transmit IF VGA 60 is then filtered by transmit IF filter 62, which filters out noise generated by the transmit IF VGA 60 in the receive band to meet receive band noise floor requirements. Transmit IF filter 62 has a center frequency approximately equivalent to the IF carrier frequency and a bandwidth sufficient to pass the modulated and amplified transmit IF information signal with minimal distortion. In the CDMA example of FIG. 3, the modulation bandwidth of the transmit IF information signal is 1.25 MHz, thus the bandwidth of transmit IF filter 62 must be at least 1.25 MHz. In preferred embodiments, the bandwidth of transmit IF filter 62 is about 5 MHz. The modulated, amplified, and filtered transmit IF information signal is then mixed with a transmit RF LO 64 in transmit upconverter mixer 66. In preferred embodiments, transmit upconverter mixer 66 generates the difference between the output of transmit IF filter 62 and transmit RF LO 64. In alternative (non-CDMA) embodiments, transmit upconverter mixer 66 is replaced by a translation loop upconverter (not shown in FIG. 3).

In embodiments of the present invention, transmit RF LO 64 is generated by a transmit RF frequency generator 68 containing a transmit RF frequency source 70 phase-locked to reference source 58 by transmit RF loop electronics 72. In preferred embodiments, transmit RF frequency source 70 comprises a VCO. However, in alternative embodiments, transmit RF frequency source 70 may be any adjustable frequency source.

The output of transmit upconverter mixer 66 is filtered by first transmit RF filter 74, which has a passband encompassing the CDMA/analog AMPS transmit band of 824–849 MHz to remove spurious frequencies generated by transmit upconverter mixer 66. The output of first transmit RF filter 74 is then amplified by transmit RF driver amplifier 76, which takes the low level output of first transmit RF filter 74 and amplifies it to mid-levels on the order of 0.10 dBm. The output of transmit RF driver amplifier 76 is then filtered by second transmit RF filter 78, which has a passband encompassing the CDMA/analog AMPS transmit band of 824–849 MHz to filter out noise in the CDMA/analog AMPS receive band generated by transmit RF driver amplifier 76. The output of second transmit RF filter 78 is then amplified by transmit RF power amplifier 80 to generate transmit RF information signal 26 at a level sufficient to meet output power requirements at antenna 22. Transmit RF information signal 26 is then filtered by duplexer 82, which has a transmit passband encompassing the CDMA transmit band of 824–849 MHz to filter out-of-band noise generated by transmit RF power amplifier 80. The output of duplexer 82 then passes through service select switch 84 within antenna coupling electronics 86 before being transmitted by antenna 22.

In the CDMA/analog AMPS receive path, signals from antenna 22 enter antenna coupling electronics 86, where they pass through service select switch 84 and are filtered by duplexer 82 having a receive passband encompassing the CDMA/analog AMPS receive band of 869–894 MHz for passing only CDMA/analog AMPS signals. The output of duplexer 82 is receive RF information signal 44, which passes through a variable gain attenuator 88 in preferred embodiments of the present invention. Variable gain attenuator 88 selectively attenuates the received signal to meet CDMA communication standard cellular receive band intermodulation requirements. However, in alternative embodiments, attenuation control may be achieved by selectively bypassing receive RF low noise amplifier (LNA) 90, or a variable gain receive RF LNA 90 may be employed instead of variable gain attenuator 88.

The output of variable gain attenuator 88 is then amplified by a receive RF LNA 90. In preferred embodiments of the present invention, receive RF LNA 90 has a noise figure (NF) of about 1.5 dB with a gain of about 20 dB.

The output of receive RF LNA 90 is then filtered by a receive RF image reject filter 92. Receive RF image reject filter 92 is a bandpass filter with a bandwidth encompassing the CDMA/analog AMPS receive band of 869–894 MHz to filter out image noise generated by receive RF LNA 90 capable of mixing with receive RF LO 94 in receive downconverter mixer 96 and producing unwanted signals in the IF band. In alternative embodiments, an image reject mixer could be used to eliminate the need for the RF image reject filter.

In embodiments of the present invention, receive RF LO 94 is generated by a receive RF frequency generator 130 comprised of a receive RF frequency source 134 phase-locked to reference source 58 by receive RF loop electronics 136. In preferred embodiments, receive RF frequency source 134 is a VCO. However, in alternative embodiments, receive RF frequency source 134 may be any adjustable frequency source.

In preferred embodiments of the present invention, receive downconverter mixer is 96 generates the difference between the output of receive RF image reject filter 92 and receive RF LO 94, designated herein as receive IF information signal 158. Receive IF information signal 158 then passes through either narrowband CDMA receive IF filter 98 with a bandwidth encompassing the CDMA modulation bandwidth of 1.25 MHz, or narrowband AMPS receive IF filter 99 with a bandwidth encompassing the AMPS modulation bandwidth of 30 kHz. The choice of filter is switchably selectable depending on whether CDMA or AMPS is being used. These filters remove spurious frequencies generated by receive downconverter mixer 96. The output of narrowband CDMA receive IF filter 98 and narrowband AMPS receive IF filter 99 is then fed into common IF VGA 100. In preferred embodiments, common IF VGA 100 has a dynamic range of about 90 dB. Common IF VGA 100 provides automatic gain control by adjusting its gain to maintain a relatively constant level into quantizers 118 in the receive path. The output of common IF VGA 100 is common IF information signal 156.

Common IF information signal 156 is mixed with receive IF LO 132 and demodulated by frequency conversion and demodulation electronics 114 within demodulator 28. In embodiments of the present invention, receive IF LO 132 is generated by a receive IF frequency generator 122, which is comprised of a receive IF frequency source 124 phase-locked to a reference source 58 by receive IF loop electronics 128. In preferred embodiments, receive IF frequency source 124 is a VCO. However, in alternative embodiments, receive IF frequency source 124 may be any adjustable frequency source.

Frequency conversion and demodulation electronics 114 produce baseband information signals 148, defined herein as either DC or a "near DC" IF (for example, a center frequency of about 1 MHz). In CDMA mode, these baseband information signals 148 comprise receive baseband signals which are filtered by CDMA baseband filters 116 and analog AMPS baseband filters 140 to remove spurious frequencies generated by frequency conversion and demodulation electronics 114. Analog AMPS baseband filters 140 have a bandwidth of about 30 kHz to accommodate the modulation bandwidth of analog AMPS receive baseband signals, and may be low pass filters if the receive baseband signals are DC, or bandpass filters if the receive baseband signals are near DC. CDMA baseband filters 116 have a bandwidth of about 1.25 MHz to accommodate the modulation bandwidth of CDMA receive baseband signals, and may be low pass filters if the receive baseband signals are DC, or bandpass filters if the receive baseband signals are near DC. The filtered and demodulated receive baseband signals are then processed by quantizers 118, which generate CDMA I and Q outputs 150 and analog AMPS I and Q outputs 152. In preferred embodiments, quantizers 118 are analog-to-digital converters (ADCs).

In the GPS receive path, GPS RF information signal 104 collected from antenna 22 passes through service select switch 84 and a preselector filter 102 having a passband encompassing the GPS receive band of 1575.42 MHz±1 MHz to pass only GPS frequencies and remove out-of-band frequencies. The filtered GPS RF information signal then passes through a GPS RF LNA 106 for amplifying the GPS RF information signal received from antenna 22. In preferred embodiments of the present invention, GPS RF LNA 106 has a noise figure (NF) of about 1.5 dB with a gain of about 20 dB.

The output of receive GPS RF LNA 106 is then filtered by a GPS RF image reject filter 108. GPS RF image reject filter 108 is a bandpass filter with a bandwidth of about 1575.42 MHz±1 MHz to filter out image noise generated by GPS RF LNA 106 capable of mixing with receive RF LO 94 and producing unwanted signals in the IF band. In alternative embodiments, an image reject mixer could be used to eliminate the need for the RF image reject filter.

In embodiments of the present invention, GPS downconverter mixer 110 generates the difference between the output of GPS RF image reject filter 108 and receive RF LO 94, designated herein as GPS IF information signal 160. Because the RF frequencies of CDMA and GPS are different, receive RF LO 94 as used by GPS downconverter mixer 110 is not generated by receive RF frequency source 134. Instead, receive RF LO 94 as used by GPS downconverter mixer 110 is generated by a GPS RF frequency source 138 in parallel with receive RF frequency source 134 and phase-locked to reference source 58 by receive RF loop electronics 136. In preferred embodiments, GPS RF frequency source 138 is a VCO. However, in alternative embodiments, GPS RF frequency source 138 may be any adjustable frequency source.

GPS IF information signal 160 then passes through a narrowband GPS IF filter 112 for filtering spurious frequencies generated by GPS downconverter mixer 110. Narrowband GPS IF filter 112 has a bandwidth of about 2 MHz to accommodate the GPS modulation bandwidth. The output of narrowband GPS IF filter 112 is then amplified by common IF VGA 100. In alternative embodiments, further sharing of the receiver front end functional blocks could be achieved if narrowband GPS IF filter 112 and narrowband CDMA receive IF filter 98 are combined into a single filter with a bandwidth that encompasses both the GPS and CDMA modulation bandwidths.

As previously noted, the outputs of narrowband CDMA receive IF filter 98 and narrowband AMPS receive IF filter 99 are also amplified by common IF VGA 100 to produce common IF information signal 156. The direct coupling of the output of these filters is achievable because only one will be passing a signal at any time as controlled by service select switch 84. However, in alternative embodiments of the present invention, further sharing of the receiver front end blocks may be achieved if a switchable broadband LNA and mixer capable of covering both CDMA and GPS bands is used. In such embodiments, the paralleled LNAs, filters, and mixers would be replaced by a single LNA, filter, and mixer, switchably couplable to the GPS RF information signal 104 or the receive RF information signal 44.

Common IF information signal 156 is then mixed with receive IF LO 132 and demodulated by frequency conversion and demodulation electronics 114 within demodulator 28. Because the IF frequencies of CDMA/analog AMPS and GPS are different, receive IF LO 132 as used for GPS demodulation is not generated by receive IF frequency source 124. Instead, receive IF LO 132 as used for GPS demodulation is generated by a GPS IF frequency source 126 in parallel with receive IF frequency source 124 and phase-locked to reference source 58 by receive IF loop electronics 128. In preferred embodiments of the present invention, GPS IF frequency source 126 is a VCO. However, in alternative embodiments, GPS IF frequency source 126 may be any adjustable frequency source.

Frequency conversion and demodulation electronics 114 produce baseband information signals 148. In GPS mode, these baseband information signals 148 comprise GPS baseband signals which are filtered by GPS baseband filters 142 to remove spurious frequencies generated by frequency conversion and demodulation electronics 114. GPS baseband filters 142 have a bandwidth of about 2 MHz to accommodate the modulation bandwidth of GPS baseband signals, and may be low pass filters if the receive baseband signals are DC, or bandpass filters if the receive baseband signals are near DC. The filtered and demodulated signals are then processed by quantizers 118, which generate GPS I and Q outputs 154.

In embodiments of the invention illustrated in FIG. 4, full GPS processing is provided by coupling GPS I and Q outputs 154 of quantizers 118 to a full GPS processor 144. In preferred embodiments of the present invention, full GPS processor 144 is a Scorpio™ device, Rockwell part number 11577, incorporated herein by reference.

In other embodiments of the present invention illustrated in FIG. 5, E911 support capability is provided by coupling a Coleman filter 146 between frequency conversion and demodulation electronics 114 and GPS baseband filters 142. Coleman filter 146 is a subset of the full GPS processor 144, and comprises a matched filter that despreads the spread spectrum GPS I and Q outputs to generate baseband signals in a format ready for baseband processing by a baseband modem (comprising a receiver, controller, and all baseband digital signal processing (DSP)). Because the Coleman filter 146 is a subset of the full GPS processor 144, alternative embodiments of the present invention with both full GPS capability and E911 support only need the full GPS processor 144, and do not require Coleman filter 146.

Referring again to FIG. 3, in embodiments of the present invention, service selector electronics 120 configures the communication transceiver with GPS capability 48 for either CDMA or GPS operation. In preferred embodiments of the present invention, service selector electronics 120 is a processor programmable by remote commands. In alternative embodiments, service selector electronics 120 may comprise a factory-programmable logic device or user-configurable logic. When service selector electronics 120 is configured for CDMA operation, service select switch 84 is configured to couple duplexer 82 to antenna 22, receive RF frequency generator 130 is configured to couple receive RF frequency source 134 to receive downconverter mixer 96, and receive IF frequency generator 122 is configured to couple receive IF frequency source 124 to frequency conversion and demodulation electronics 114. When service selector electronics 120 is configured for GPS operation, service select switch 84 is configured to couple preselector filter 102 to antenna 22, receive RF frequency generator 130 is configured to couple GPS RF frequency source 138 to receive downconverter mixer 110, and receive IF frequency generator 122 is configured to couple GPS IF frequency source 126 to frequency conversion and demodulation electronics 114.

Embodiments of the present invention described above employ a separate transmit IF frequency source 54, receive IF frequency source 124, and GPS IF frequency source 126, along with separate transmit IF loop electronics 56 and receive IF loop electronics 128. However, in alternative embodiments of the present invention, receive IF frequency source 124 and GPS IF frequency source 126 may comprise a common IF frequency source, or in further alternative embodiments, transmit IF frequency source 54, receive IF frequency source 124, and GPS IF frequency source 126 may comprise a common IF frequency source, and transmit IF loop electronics 56 and receive IF loop electronics 128 may comprise the same electronics. In such embodiments, service selector electronics 120 configures the common loop electronics to produce the desired frequency from the common frequency source.

Embodiments of the present invention described above employ a separate transmit RF frequency source 70, receive RF frequency source 134, and GPS RF frequency source 138, along with separate transmit RF loop electronics 72 and receive RF loop electronics 136. However, in alternative embodiments of the present invention, receive RF frequency source 134 and GPS RF frequency source 138 may comprise a common RF frequency source, or in further alternative embodiments, transmit RF frequency source 70, receive RF frequency source 134, and GPS RF frequency source 138 may comprise a common RF frequency source, and transmit RF loop electronics 72 and receive RF loop electronics 136 may comprise the same electronics. In such embodiments, service selector electronics 120 configures the common loop electronics to produce the desired frequency from the common frequency source.

It should be noted that although the preceding discussion focused on multi-service CDMA/analog AMPS and GPS capabilities, alternative embodiments of the present invention can be extended to include multi-band, multi-service transceivers. For example, along with GPS capability, cellular communications capable of operating under multiple communication standards such as CDMA and GSM may be employed. Multi-band transceivers according to alternative embodiments employ a combination of parallel functional blocks in the RF sections, and shared functional blocks in the IF sections.

Therefore, according to the foregoing description, preferred embodiments of the present invention provide a system and process for a multi-band communication unit that shares the same frequency sources and filters between transmitters and receivers and between bands to minimize size, weight, complexity, power consumption, and cost.

The foregoing description of preferred embodiments of the invention has been presented for the purposes of illustration and description. It is not intended to be exhaustive or to limit the invention to the precise form disclosed. It is intended that the scope of the invention be limited not by this detailed description, but rather by the claims appended hereto.

What is claimed is:

1. A communication system for communicating first information signals at any one of a plurality of communication standards through a common antenna, the communication system comprising:

a transmitting unit having a modulator for modulating a transmit second local oscillator (LO) frequency with a transmit baseband information signal to generate a transmit second information signal, an upconverter for upconverting the transmit second information signal with a transmit first LO frequency to generate at least one transmit first information signal, and at least one transmit first information signal output for communicating the at least one transmit first information signal;

a receiving unit having at least one receive first information signal input for communicating at least one receive first information signal and a Global Positioning System (GPS) first information signal input for communicating a GPS first information signal, the receiving unit having at least one receive downconverter for downconverting the at least one receive first information signal with a receive first LO frequency to generate a receive second information signal, a GPS downconverter for downconverting the GPS first information signal with the receive first LO frequency to generate a GPS second information signal, and a demodulator for demodulating the receive second information signal and the GPS second information signal with a receive second LO frequency to generate GPS and receive baseband signals; and an antenna coupled to the at least one transmit first information signal output, the at least one receive first information signal input, and the GPS first information signal input for transmitting and receiving first information signals.

2. A communication system as recited in claim 1, further including a GPS processor coupled for receiving the GPS baseband signals, the GPS processor having a GPS engine for performing GPS processing and acquisition.

3. A communication system as recited in claim 1, further including a Coleman filter coupled for receiving the GPS baseband signals, the Coleman filter having a matched filter for despreading the GPS baseband signals and providing E911 support.

4. A communication system as recited in claim 1, wherein one of the plurality of communication standards is Code Division Multiple Access (CDMA).

5. A communication system as recited in claim 1, the receiving unit further including a common second variable gain amplifier coupled for receiving the receive second information signal and the GPS second information signal, the common second variable gain amplifier for amplifying and transmitting the receive second information signal and the GPS second information signal to the demodulator, the common second variable gain amplifier having a dynamic range of about 90 dB.

6. A communication system as recited in claim 5, the receiving unit further including a GPS first low noise amplifier coupled between the antenna and the GPS downconverter for amplifying the GPS first information signal received from the antenna, the GPS first low noise amplifier having a noise figure of about 1.5 dB and a gain of about 20 dB.

7. A communication system as recited in claim 6, the receiving unit further including a preselector filter coupled between the antenna and the GPS first low noise amplifier for filtering the GPS first information signal received from the antenna, the preselector filter having a passband of about 1574.42–1576.42 MHz.

8. A communication system as recited in claim 6, the receiving unit further including a GPS first image reject filter coupled between the GPS first low noise amplifier and the GPS downconverter for filtering image frequencies generated by the GPS first low noise amplifier, the GPS first image reject filter having a passband of about 1574.42–1576.42 MHz.

9. A communication system as recited in claim 5, the receiving unit further including a GPS narrowband second filter coupled between the GPS downconverter and the common second variable gain amplifier for filtering spurious frequencies generated by the GPS downconverter, the GPS narrowband second filter having a bandwidth of about 2 MHz.

10. A communication system as recited in claim 1, further including a common first frequency source for generating the receive first LO frequency, wherein the at least one receive downconverter mixes the at least one receive first information signal with the receive first LO frequency to produce the receive second information signal, and the GPS downconverter mixes the GPS first information signal with the receive first LO frequency to produce the GPS second information signal.

11. A communication system as recited in claim 1, further including a common second frequency source for generating the receive second LO frequency, wherein the demodulator mixes the receive second information signal with the receive second LO frequency to produce the receive baseband signals, and mixes the GPS second information signal with the receive second LO frequency to produce the GPS baseband signals.

12. A communication system as recited in claim 1, further including a common first frequency source for generating the receive first LO frequency and the transmit first LO frequency, wherein the at least one receive downconverter mixes the at least one receive first information signal with the receive first LO frequency to produce the receive second information signal, the GPS downconverter mixes the GPS first information signal with the receive first LO frequency to produce the GPS second information signal, and the upconverter mixes the transmit second information signal with the transmit first LO frequency to produce the at least one transmit first information signal.

13. A communication system as recited in claim 1, further including a common second frequency source for generating the receive second LO frequency and the transmit second LO frequency, wherein the demodulator mixes the receive second information signal with the receive second LO frequency to produce the receive baseband signal and mixes the GPS second information signal with the receive second LO frequency to produce the GPS baseband signal, and wherein the modulator mixes the transmit baseband information signal with the transmit second LO frequency to produce the transmit second information signal.

14. A communication system receiving unit as recited in claim 1, further including a GPS processor for receiving the GPS baseband signals, the GPS processor comprising a GPS engine for performing GPS processing and acquisition.

15. A communication system receiving unit as recited in claim 1, further comprising a Coleman filter coupled for receiving the GPS baseband signals, the Coleman filter having a matched filter for despreading the GPS baseband signals and providing E911 support.

16. A process for communicating first information signals at any one of a plurality of communication standards through a common antenna, the process comprising:

modulating a transmit second LO frequency with a transmit baseband information signal to generate a transmit second information signal, upconverting the transmit second information signal with a transmit first LO frequency to generate at least one transmit first information signal, and transmitting the at least one transmit first information signal through the antenna;

receiving at least one receive first information signal from the antenna, downconverting the at least one receive first information signal with a receive first LO frequency to generate a receive second information signal, and demodulating the receive second information signal with a receive second LO frequency to generate a receive baseband information signal; and receiving a GPS first information signal from the antenna, downconverting the GPS first information signal with the receive first LO frequency to generate a GPS second information signal, and demodulating the GPS second information signal with the receive second LO frequency to generate a GPS baseband information signal.

17. A process as recited in claim 16, further including the steps of:

filtering the receive baseband signals to remove out of band frequencies and quantizing the receive baseband signals; and filtering the GPS baseband signals to remove out of band frequencies and quantizing the GPS baseband signals.

18. A process as recited in claim 17, wherein preceding the step of filtering the GPS baseband signals to remove out of band frequencies, the process further includes the step of Coleman filtering the GPS baseband signals for despreading the GPS baseband signals and providing E911 support.

19. A process as recited in claim 17, wherein following the step of quantizing the GPS baseband signals, the process further includes the step of performing GPS processing and acquisition on the quantized GPS baseband signals.

20. A communication system for communicating first information signals at any one of a plurality of communication standards through a common antenna, the communication system comprising:

means for modulating a transmit second LO frequency with a transmit baseband information signal to generate a transmit second information signal, upconverting the transmit second information signal with a transmit first LO frequency to generate at least one transmit first information signal, and transmitting the at least one transmit first information signal through the antenna;

means for receiving at least one receive first information signal from the antenna, downconverting the at least one receive first information signal with a receive first LO frequency to generate a receive second information signal, and demodulating the receive second information signal with a receive second LO frequency to generate a receive baseband information signal; and means for receiving a GPS first information signal from the antenna, downconverting the GPS first information signal with the receive first LO frequency to generate a GPS second information signal, and demodulating the GPS second information signal with the receive second LO frequency to generate a GPS baseband information signal.

21. A system as recited in claim 20, further including:

means for filtering the receive baseband signals to remove out of band frequencies and quantizing the receive baseband signals; and means for filtering the GPS baseband signals to remove out of band frequencies and quantizing the GPS baseband signals.

22. A system as recited in claim 21, further including means for Coleman filtering the GPS baseband signals for despreading the GPS baseband signals and providing E911 support, the means for Coleman filtering the GPS baseband signals coupled between the means for demodulating the GPS second information signal with the receive second LO frequency and the means for filtering the GPS baseband signals.

23. A system as recited in claim 21, further including means for performing GPS processing and acquisition on the quantized GPS baseband signals, the means for performing GPS processing and acquisition coupled to the means for quantizing the GPS baseband signals.

24. A communication system receiving unit for receiving a first information signal via a common antenna comprising:

a first information signal input for receiving the first information signal, and a global positioning system (GPS) information signal input for receiving a GPS first information signal, a downconverter for downconverting the first information signal in accordance with a receive first local oscillator frequency to generate a second information signal, a GPS downconverter for downconverting the GPS information signal in accordance with the receive first local oscillator frequency to generate a second GPS information signal, and a demodulator for demodulating the second information signal and the second GPS information signal with a receive second local oscillator frequency to generate GPS and receive baseband signals.

25. A process for receiving a first information signal via a common antenna comprising:

receiving a first information signal from the common antenna;

downconverting the received first information signal with a receive first local oscillator frequency to generate a receive second information signal;

demodulating the receive second information signal with a receive second local oscillator frequency to generate a receive baseband information signal;

receiving a GPS first information signal from the antenna;

downconverting the GPS first information signal with the receive first local oscillator frequency to generate a GPS second information signal, and demodulating the GPS second information signal with the receive second local oscillator frequency to generate a GPS baseband information signal.

26. A process as recited in claim 25, further comprising the steps of:
   filtering the receive baseband signals to remove out of band frequencies; quantizing the and receive baseband signals; and
   filtering the GPS baseband signals to remove out of band frequencies and quantizing the GPS baseband signals.

27. A communication system for communicating first information signals at any one of a plurality of communication standards through a common antenna, the communication system comprising:
   means for receiving a first information signal from the common antenna, downconverting the receive first information signal with a receive first local oscillator frequency to generate a second information signal, and demodulating the second information signal with a receive second local oscillator frequency to generate a receive baseband information signal; and
   means for receiving a first GPS information signal from the antenna, downconverting the first GPS information signal with the receive first local oscillator frequency to generate a second GPS information signal, and demodulating the second GPS information signal with the receive second local oscillator frequency to generate a GPS baseband information signal.

28. A communication system as recited in claim 27, further comprising:
   means for filtering the receive baseband signals to remove out of band frequencies and quantizing the receive baseband signals; and
   means for filtering the GPS baseband signals to remove out of band frequencies and quantizing the GPS baseband signals.

29. A communication system for transmitting and receiving a first information signal via a common antenna comprising:
   a first information signal input for receiving a first information signal, and a global positioning system (GPS) information signal input for receiving a GPS first information signal,
   a downconverter for downconverting said first information signal in accordance with a receive first local oscillator frequency to generate a second information signal,
   a GPS downconverter for downconverting the GPS information signal in accordance with the receive first local oscillator frequency to generate a second GPS information signal, a demodulator for demodulating the second information signal and the second GPS information signal with a receive second local oscillator frequency to generate GPS and receive baseband signals,
   a modulator for modulating said first local oscillator frequency with a baseband information signal to generate a third information signal, and
   an upconverter for upconverting the third information signal with a second local oscillator frequency to generate a fourth information signal.

30. A communication system transmitting unit according to claim 29 wherein said transmitting unit transmits said second information signal via a common antenna shared with a global positioning system receiving unit.

31. A communication system transmitting unit according to claim 30 wherein the second information signal comprises a CDMA format information signal.

32. A communication system comprising:
   means for receiving a first information signal from a common antenna, downconverting the receive first information signal with a receive first local oscillator frequency to generate a second information signal, and demodulating the second information signal with a receive second local oscillator frequency to generate a receive baseband information signal;
   means for receiving a first GPS information signal from the antenna, downconverting the first GPS information signal with the receive first local oscillator frequency to generate a second GPS information signal, and demodulating the second GPS information signal with the receive second local oscillator frequency to generate a GPS baseband information signal;
   means for modulating said first local oscillator frequency with a baseband information signal to generate a third information signal,
   means for upconverting the third information signal with a second local oscillator frequency to generate a fourth information signal, and
   means for outputting said fourth information signal.

33. A communication system transmitting unit according to claim 32 wherein the second information signal conforms to CDMA standards.

34. A communication system transmitting unit according to claim 33 wherein the means for outputting comprises a common antenna shared with a global positioning system.

* * * * *